(12) United States Patent
Rich et al.

(10) Patent No.: US 10,326,914 B2
(45) Date of Patent: Jun. 18, 2019

(54) METHOD FOR DIGITALLY PRINTING COLOR SELECTION CARDS BY MATCHING THE BASE INKS TO THE BASE PAINTS, DYES, OR PLASTICS

(71) Applicants: SUN CHEMICAL CORPORATION, Parsippany, NJ (US); Danny Rich, Trenton, NJ (US); Aileen Chiu, Tega Cay, SC (US); Veronika Lovell, Charlotte, NC (US)

(72) Inventors: Danny Rich, Trenton, NJ (US); Aileen Chiu, Tega Cay, SC (US); Veronika Lovell, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 587 days.

(21) Appl. No.: 14/906,428

(22) PCT Filed: Aug. 6, 2014

(86) PCT No.: PCT/US2014/049912
§ 371 (c)(1),
(2) Date: Jan. 20, 2016

(87) PCT Pub. No.: WO2015/023487
PCT Pub. Date: Feb. 19, 2015

(65) Prior Publication Data
US 2016/0155367 A1 Jun. 2, 2016

Related U.S. Application Data

(60) Provisional application No. 61/864,777, filed on Aug. 12, 2013.

(51) Int. Cl.
| | |
|---|---|
| *C09D 11/322* | (2014.01) |
| *C09D 11/037* | (2014.01) |
| *C09D 11/033* | (2014.01) |
| *C09D 11/40* | (2014.01) |
| *C09D 11/36* | (2014.01) |
| *C09D 11/34* | (2014.01) |
| *B41J 2/21* | (2006.01) |
| *B41M 3/00* | (2006.01) |
| *B41M 5/00* | (2006.01) |
| *G01J 3/46* | (2006.01) |
| *G01J 3/52* | (2006.01) |
| *G09F 3/02* | (2006.01) |
| *G09F 5/04* | (2006.01) |
| *H04N 1/54* | (2006.01) |
| *H04N 1/60* | (2006.01) |
| *C09D 11/101* | (2014.01) |
| *C09D 11/328* | (2014.01) |

(52) U.S. Cl.
CPC ............ *H04N 1/6038* (2013.01); *B41J 2/211* (2013.01); *B41M 3/005* (2013.01); *B41M 5/0023* (2013.01); *C09D 11/033* (2013.01); *C09D 11/037* (2013.01); *C09D 11/101* (2013.01); *C09D 11/322* (2013.01); *C09D 11/34* (2013.01); *C09D 11/36* (2013.01); *C09D 11/40* (2013.01); *G01J 3/462* (2013.01); *G01J 3/463* (2013.01); *G01J 3/52* (2013.01); *G09F 3/02* (2013.01); *H04N 1/54* (2013.01); *C09D 11/328* (2013.01); *G09F 2003/0202* (2013.01); *G09F 2003/0276* (2013.01); *G09F 2003/0279* (2013.01); *G09F 2003/0282* (2013.01)

(58) Field of Classification Search
CPC .... H04N 1/50; H04N 1/56; H04N 1/60–6097; G06K 15/1878; C09D 11/033; C09D 11/037; C09D 11/101; C09D 11/322; C09D 11/328; C09D 11/34; C09D 11/36; C09D 11/40; B41J 2/211; B41M 3/005; B41M 5/0023; G01J 3/52; G01J 3/463; G01J 3/462; G09F 3/02
See application file for complete search history.

(56) References Cited

U.S. PATENT DOCUMENTS

| | | | | |
|---|---|---|---|---|
| 6,342,952 | B1 * | 1/2002 | Chan | B41F 33/00 345/593 |
| 6,717,673 | B1 * | 4/2004 | Janssen | G01J 3/46 356/402 |
| 7,258,407 | B1 * | 8/2007 | Stelter | B41J 2/1707 347/7 |
| 7,502,068 | B2 | 3/2009 | Narayanaswami et al. | |
| 7,933,053 | B2 * | 4/2011 | Dalal | H04N 1/6058 358/1.6 |
| 9,106,874 | B2 * | 8/2015 | Smith | H04N 1/603 |
| 2002/0149770 | A1 * | 10/2002 | Kubo | G01J 3/0251 356/402 |
| 2004/0118310 | A1 * | 6/2004 | Hawksworth | B41N 3/034 101/483 |
| 2007/0097175 | A1 * | 5/2007 | Stelter | B41J 2/211 347/43 |
| 2007/0263249 | A1 * | 11/2007 | Rich | H04N 1/54 358/1.15 |

(Continued)

FOREIGN PATENT DOCUMENTS

| | | | | |
|---|---|---|---|---|
| EP | 1 439 068 A2 | 7/2004 | | |
| WO | WO 2007091278 A1 * | 8/2007 | | B41M 1/14 |

OTHER PUBLICATIONS

Supplementary European Search Report issued in related European Application No. EP14836480.5, dated Feb. 16, 2017.

(Continued)

*Primary Examiner* — Scott A Rogers
(74) *Attorney, Agent, or Firm* — Charles C. Achkar; Ostrolenk Faber LLP.

(57) ABSTRACT

A system and method are described for the production of color selection swatch cards for point of purchase displays of custom blended paints, textiles or plastics using a digital inkjet printer and custom blended inkjet inks based on a set of base inks that can be blended using commercial match prediction software. The base inks are matched spectrally to the base paints, dyes or plastics.

30 Claims, No Drawings

(56) References Cited

U.S. PATENT DOCUMENTS

| | | |
|---|---|---|
| 2010/0039463 A1 | 2/2010 | Van Thillo et al. |
| 2010/0067056 A1* | 3/2010 | Rich ........................ H04N 1/54 358/2.1 |
| 2010/0208278 A1* | 8/2010 | Brewington ....... H04N 1/32502 358/1.9 |
| 2011/0149312 A1 | 6/2011 | Mestha |
| 2011/0268897 A1 | 11/2011 | Klemann et al. |
| 2011/0279833 A1 | 11/2011 | Hoshii et al. |
| 2012/0090488 A1* | 4/2012 | Postle ...................... H04N 1/54 101/483 |
| 2012/0313996 A1 | 12/2012 | Veis |
| 2017/0144476 A1* | 5/2017 | Postle .................... B41M 3/008 |
| 2018/0126747 A1* | 5/2018 | Katsuno ................. B41J 2/2117 |

OTHER PUBLICATIONS

International Preliminary Report Issued in International Application No. PCT/US2014/049912, dated Feb. 16, 2016.
International Search Report issued in International Application No. PCT/US2014/049912 dated Nov. 19, 2014.
Written Opinion of the International Searching Authority issued in International Application No. PCT/US2014/049912 dated Nov. 19, 2014.

* cited by examiner

METHOD FOR DIGITALLY PRINTING COLOR SELECTION CARDS BY MATCHING THE BASE INKS TO THE BASE PAINTS, DYES, OR PLASTICS

CROSS REFERENCE TO RELATED APPLICATIONS

The present application is a § 371 National Phase application based on PCT/US2014/049912 filed Aug. 6, 2014, which claims the benefit of U.S. Provisional Application No. 61/864,777 filed Aug. 12, 2013 the subject matter of each of which is incorporated by reference in their entirety.

FIELD OF THE INVENTION

The present invention relates to a method of producing a custom color ink by blending inkjet base inks with transparent white (i.e. clear) bases. The present invention further relates to a system for matching the custom color inks to one or more desired reference colors, and using the custom color inks to print articles wherein specific colors must be used, such as logos in company letterhead, color sample cards depicting paint colors or textile colors, and the like.

BACKGROUND OF THE INVENTION

The world is rich with many colors, and variations thereof, based on lightness, hue, and saturation within a certain color family. Many products are manufactured that are colored in very specific ways, such as architectural coatings (i.e. paints), cosmetics, textiles, and the like. Standard color selection systems are published, including the Pantone Color Guides, the Dainippon Ink and Chemicals (DIC) Color Guide, the RAL Color Standard, the HKS Color System, the Natural Color System (NCS), the Munsell Book of Color, and the like. It is often desirable to present the full selection of colors in a visual display. Because of the many colors that may be available, it is challenging to create a display that is easy to understand, and from which a customer may choose the desired color. Manufacturers often use color sample cards, or textile swatches, or color charts to present the range of colors, and all of their variations. The arrangement of these color sample cards, textile swatches, and color charts is essential to creating a pleasing visual display.

Currently, color sample cards are typically produced by blade coating a wide roll of paper, air drying the coated paper, rolling the paper up, and then taking the roll of paper to a printing system, such as a web-offset press, in order to print onto the substrate labels, identifiers, trademarks and such in a second printing step, so that consumers can identify the color that is selected by the store technician who will then request the formula from the recipe database. If anything goes wrong, the whole process must be repeated. Therefore, there is a need for a more efficient process to produce the color sample cards.

Moreover, it has typically been a challenge to accurately re-produce the range of colors available for a product, such as a paint, onto, for example, color sample cards. Various methods of printing custom-colors have been developed in an attempt to re-produce the full range of colors, wherein the colors closely match the actual product colors.

Typically, custom colors have been printed by halftone printing, wherein the desired color is achieved by overprinting different amounts of the primary colors in a set, such as the cyan, magenta, yellow and black (CMYK) cartridges found in standard ink jet printers, as well as extended color ink sets for ink jet printers in general, such as CMYK+OGV. However, the number of custom colors that can be produced in this way is limited by the number of primary colors that are used. Despite advances, the halftone process is severely limited in terms of accuracy of the output color, registration of color, non-uniformity of the color, blurring, color variances, etc.

U.S. Pat. No. 6,270,123 discloses a color identification and selection display, based on lightness values or levels, for use in connection with the retail sale of custom-tinted architectural coatings and paints.

U.S. Pat. Nos. 7,502,033 and 8,089,482 disclose a computer display of color elements that is grouped within a plurality of color families which are organized in accordance with a circular color chart and a columnar chart.

U.S. Pat. No. 7,999,825 discloses a computer-based color selection system. The colors in the database are arranged based on color theory.

U.S. Patent Application No. 2004/0046803 discloses a computer-based color selection system. A plurality of colors are categorized into one of a plurality of color groups, to which a reference color can be matched.

U.S. Patent Application No. 2005/0146531 discloses a paint color matching and coordinating system which chooses harmonious sets of paint colors based on an input reference color.

U.S. Patent Application No. 2006/0203245 discloses a color card wherein a light color tone occupies a larger space than the darker color tones on a color card.

U.S. Patent Application No. 2008/0026347 discloses a kit that can be used to create and select paint colors, containing at least one base color paint, several containers of colored tints, and a booklet with coordinated matching sheets and self-adhesive stickers.

U.S. Patent Application No. 2010/0169255 discloses a searchable database for finding a paint color having a desired texture. Methods for using the database are also disclosed.

U.S. Pat. No. 6,938,984 discloses an inkjet printing system apparatus, wherein a custom color is produced by mixing multiple colored inks blended in pre-selected combinations, and printing a solid image pattern, rather than multiple halftone image patterns. Although U.S. Pat. No. 6,938,984 mentions that ink colors are matched to custom colors, no color matching criteria are provided. The focus of the invention is the configuration of the printer itself.

U.S. Pat. No. 7,258,407 discloses dispensing two primary color inks into a custom color chamber, mixing the inks, and printing the custom color ink from the custom color chamber with a print head.

U.S. Pat. Nos. 7,259,890 and 7,551,321 disclose the use of a printing device that has several cartridges, such as cyan, yellow, magenta, and black (CYMK), plus a custom cartridge containing a non-standard colorant material. Each cartridge has an e-label (memory storage element) that identifies the ink contained in that cartridge.

U.S. Pat. No. 7,942,488 discloses a custom color print head capable of mixing custom color inks for an imaging device, by combining inks from a pre-loaded set of color ink sticks.

U.S. Pat. No. 8,282,197 discloses an inkjet printing method wherein two or more color inkjet inks having the same color and color density, but different compositions, are mixed, and then printed.

WO 2008/045352 discloses custom printed retail paint merchandizing aids, such as color cards, having one or more color schemes displayed in predetermined fields for use in selecting custom-mixed architectural coating colors. The cards are printed using inkjet inks that are formulated with the same pigment dispersions as the architectural coatings, and are thus limited only to those particular pigment dispersions, which are generally aqueous. In addition, the pigment dispersions may not be well-suited for the requirements for inkjet inks. WO 2008/045352 further discloses that the texture (i.e. gloss, matte, etc.) can be reproduced by choosing particular substrates. However, the inks are printed in the conventional manner, and therefore utilize the limited halftone printing process. As such, overprinted colors will not necessarily attain the texture properties of the substrate.

Efforts have been made to develop digital color selection systems. For example, PantoneLIVE™ is a digital color palette library developed by Pantone, Sun Chemical and Esko. Each color is associated with a spectral signature in terms of lightness, red/green value, and yellow/blue value. Using the reference color spectral data, custom spot color inks matching the reference colors can be developed using the InkFormulation Software (IFS) technology. Using IFS, an appropriate ink formulation is predicted, so that the printed color will match the Pantone® reference color. Currently, PantoneLIVE™ and other color selection systems are used by printers/converters for press printing. There is currently no way to use the PantoneLIVE™ digital library, or other systems, to formulate inkjet inks to match the reference colors.

Currently, commercial producers of house paints invest up to many millions of dollars annually in the production of marketing aids. Thus, there is a need for an efficient custom color printing system that can accurately reproduce and show a range of custom colors.

SUMMARY OF THE INVENTION

The present invention provides a method for digitally printing a custom color comprising:
 a) producing a custom color ink that is a spectral match to a reference color by blending an inkjet base ink with a transparent white base to produce a color; wherein the reflectance factor value of the inkjet base ink differs by no more than 3%, and preferably no more than 1%, from the reflectance factor value of the paint primary color base of the reference color at each wavelength; and
 b) printing the custom color ink using an inkjet printer to produce the printed custom color.

The present invention also provides a color swatch card, palette, or display, produced using the method of the present invention.

These and other objects, advantages, and features of the invention will become apparent to those persons skilled in the art upon reading the details of the methods and formulations as more fully described below.

DETAILED DESCRIPTION OF THE INVENTION

In the present invention, different pigments are used in the bases, but the bases are matched to the spectral signature of universal dispersions. Thus, metamerism is controlled in a much simpler manner. In the present invention, the inkjet inks are prepared before jetting, and thus only one ink layer is required to produce the desired color. This is advantageous because it enables a wider range of printed custom colors than the traditional half-tone printing. Furthermore, the surface appearance of the color will be modulated by the surface appearance of the substrate, allowing for more accurate representation of the texture, and how a custom color will look on a particular texture, when producing color samples of, for example, paint colors, textile colors, and the like.

In the present invention, the printed text is preferably applied in a single step at the same time that the color swatches are being printed, thus greatly reducing the time and handling from a request for swatches, to a finished marketing aid. This also represents energy savings and waste reduction, as two distinct printing operations can be condensed into a single print step.

It is well known in the graphic reproduction of packaging markets that UV cured inks are extremely durable against mechanical abrasion, or dilution with common household solvents. Thus, it is a preferred embodiment of the present invention that the inkjet inks are energy curable, preferably UV curable. But this is not a requirement, and solvent-based and water-based digital inks could also be used.

The general chemistry of the inks used in the method of the present invention is not critical, and virtually any materials and formulations that are suitable for use in UV curable, solvent-based and water-based inkjet inks can be used. However, it is not uncommon for the spectral output of finished inks to shift when the chemistry is changed. Thus, when changing the chemistry of the inkjet inks used in the method of the present invention (e.g. from solvent-based to UV curable), it may be necessary to rematch the set of primary inkjet inks to the primary colors in the paint matching system such that the inkjet inks remain a close spectral match to the paint primaries.

The present invention describes a system and method for the production of color selection swatch cards for point of purchase displays of custom blended paints using a digital inkjet printer and custom blended inkjet inks based on a set of base inks that can be blended using commercial match prediction software. The base inks are matched spectrally to the base paints.

In a preferred embodiment, the present invention consists of a set of inkjet inks that are spectrally matched to a set of universal dispersions used to color white bases in a point of purchase retail or commercial paint store, a computer-assisted colorant recipe prediction system with a library with the inkjet colorants' optical properties, a computer interfaced inkjet ink dispensing system, and, preferably, a wide format inkjet printer with at least 7 print heads (although inkjet printers with fewer print heads, or any type of inkjet printer such as, for example, page-width printers, could also be used), and ink supplies. The inkjet inks will preferably be energy curable, but they may also be water-based or solvent based. The image for the prints will preferably be a PDF/X type document (although other imaging systems known in the art could also be used), preferably with variable text, and 5 to 7 color patches. Each patch is to be printed using a different print head and colored ink. The identifications and labels will preferably be printed with the last print head and ink, typically black, but may be a lighter color if there are dark colored patches on the card.

The present invention discloses the production of color matches by blending inkjet ink bases. In the present invention, the inkjet ink bases are spectrally matched to the universal dispersions, using pigments that are ideally suited to the inkjet medium and to the ink curing process (see description of a "spectral match" below). This will result in inkjet bases that behave optically as if they were produced in the same chemistry as the universal dispersions, without requiring the water borne dispersions. According to the present invention, the digital inkjet press will print the color chips and the labels, and interface directly with a laser or knife based stencil cutting machine that will cut apart the strips of chips and stack them for shipping.

One skilled in the art will understand that by "spectral match" is meant that the spectral reflectance factor curve of the inkjet primary color will exhibit a minimum of deviations from the spectral reflectance factor curve of the paint primary color. Reflectance is the amount of radiation reflected from a surface compared to the amount of incoming radiation. The reflectance factor value is calculated for each wavelength of incoming radiation, and is equal to the ratio given by the amount of reflected radiation divided by the amount of incoming radiation. This can be measured by a spectrophotometer. When two colors are a "spectral match," their reflectance factor values will differ by no more than 3%, and preferably no more than 1%, at each wavelength. This can be shown by graphing the spectral reflectance curves of the reflectance factor value versus wavelength for each color.

Spectral deviation can be verified using a metamerism index (MI). If two colors are a spectral match, they will look the same under all sources of illumination. When colors appear to be the same under at least one source of illumination, but different under at least one other source of illumination, they are known as metamers. If using a special index of metamerism, one that compares the color differences between the inks and the paints for multiple illuminants, at least 3 illuminants are required, a daylight illuminant, an incandescent illuminant and an office light illuminant. These may be, but are not restricted to, CIE standard illuminants, such as D65, A, F2 (typical of cool white fluorescent lamp light) or F11 (typical of a modern high efficiency tri-phosphor fluorescent lamp). If using a general index of metamerism, one that compares the spectral color stimulus functions of the inkjet primaries and the paint primaries, the comparison shall be performed wavelength by wavelength across the visible spectrum (400 nm to 700 nm) at intervals of 10 nm, or preferably 5 nm. The spectral color stimulus function is the wavelength by wavelength product of one standard illuminant, such as CIE D65, but it may be other CIE daylight illuminants, with the reflectance factor of the selected primary color. The result will be a series of comparisons (for example 31 or 61) between the inkjet primary reflectance curve and the paint primary reflectance curve, weighted by the CIE standard observer functions, thus emphasizing differences where the human observer is most sensitive and tolerating differences where the human observer has minimal sensitivity to the differences in reflectance factor. The discrete points may be further combined into a single index by taking a sum of squares or sum of the absolute value of the individual differences. If the two primaries are an exact spectral match then the differences and the sums will have the value of zero (0).

The use of a computer assisted color recipe prediction system with a library containing the optical properties of the primary inks and an ink dispensing system is known in the art. One such system is provided in U.S. Pat. Nos. 7,034,960, 7,202,976, 7,268,918, 7,738,149 and 8,233,189, all of which are incorporated by reference.

In the process of the present invention, the colors of a set of paint swatches are preferably submitted to the colorant recipe prediction software in the form of a spectral reflectance factor table, although virtually any other known methods of color matching could be used, including manual color matching. For submission to the colorant recipe prediction software, the spectral curve data of a sample is measured with a diffuse spectrophotometer or spectrocolorimeter, or 45:0 or multiangle instruments, and the like, and the data is entered into the software. A predicted formula for each color is produced and proofed. If the proofed color is within the tolerances on total color differences ($\Delta E$) and on metamerism (MI) supplied by the paint manufacturer, then the recipe is dispensed into a container. The $\Delta E$ tolerance for most commercial matches is 1.0, but for certain applications or customers, the $\Delta E$ tolerance could be 1.50, 2.00, or possibly even higher. The MI may be either a CIE special index comprised of one or more $\Delta E$ values for additional illuminants (A, F2, F11, etc.) or it may preferably be a spectral conformance index (a general index of metamerism) based on the differences between the spectral reflectance factor curves of the ink primary and the paint primary, wavelength by wavelength across the visible spectrum. The MI tolerance is generally greater than the $\Delta E$ tolerance, usually about one and a half to two times greater. If the $\Delta E$ and MI tolerance of the color are not met in the initial match, then a correction or series of corrections would be required until the tolerances are met. Preferably, corrections would be carried out using colorant prediction software, but as aforementioned, any known color matching technique could be enlisted. The dispensed inks are then preferably brought to any type of inkjet printer, including a wide format inkjet printer (such as a Mimaki JVX400LX latex printer), and charged into the print heads. The PDF/X graphic is preferably run through the printer's raster image processor (RIP) and the colors assigned to the appropriate print heads. The image is preferably downloaded into the printer's memory and the printing is started. The printing continues until the number of requested copies has been completed and then the printing ceases. Advantageously, the labels printed onto the color sample prints can be printed by the last print head, eliminating the need for an additional printing run.

After the printing has ceased, parts of the inkjet printer, which may include ink cartridges, tubes and print heads, or just the individual print heads, are removed and cleaned so that the next color ink may be charged into the head. Alternatively, it may be less expensive to simply replace the print head rather than cleaning the print head. The next set of inks are processed and charged into the print heads and the printing process is repeated. Finished prints may be submitted to a UV lamp station for curing or to a low temperature forced air oven for drying.

Once the prints are dried or cured, they can be stacked and moved to a slitting or stencil cutting machine to separate the groups of color patches into strips. The strips would be gathered and shipped to a warehouse for distribution to the point of sale.

It should be noted that printing colors with an inkjet printing head is not restricted to paper substrates. Inkjet inks are known to be printed directly onto cloth substrates in a process known as textile printing. Traditionally, textile printing has used the methods of pad printing or screen printing where dye-based inks are applied to the cloth and then chemically or thermally "fixed" to the fibers of the cloth. More recently, it has been disclosed that it is possible to use dye-based inkjet inks to produce images on cloth, much like the home inkjet printer which uses dye-based inkjet inks to print on paper substrates. But, unlike the prints from a home inkjet printer, which are not "fast" to exposure to water, solvents, and light, leading to bleeding and fading, commercially printed textiles are put through a "fixing" process where the dyes are chemically bound to the fibers of the substrate. The chemical reaction of the dyes with the fibers makes the printed cloth far less susceptible to the impact of environmental processes. In particular, UV-cured inks are known for possessing great stability after curing, and so processing the textile printed with UV-cured inks will provide a very durable, colored fabric. Since fabrics are also marketed with the delivery of small swatches of colored fabric, the present invention could be utilized to develop textile or fabric swatches using the very same inventive process. Prior art methods for the production of textile swatches normally involve dipping or vat dyeing of small lots of fabric, which are then fixed with a steam process. Again, the swatches would be cut from a larger piece of cloth and mounted to printed card stock carriers, or the identification could be printed by the inkjet directly onto the textile substrate. The present invention would allow the manufacture of multiple swatches, labeled and mounted in a single continuous step, greatly speeding up the process and reducing the waste normally experienced in vat dyeing.

Finally, it will be noted that UV-cured inks are routinely printed onto plastic films used in the production of consumer packaging, generally food packaging. The prints are known to be durable, and capable of producing a large gamut of custom color. The production of colored engineering plastics requires the development of chips and guides showing the range of color that can be produced in a given plastic. It is very time consuming and expensive to charge an injection molding machine to produce these plastic chip "swatches". Because the current invention allows the inkjet to be spectrally matched to the color of the process primary, it is possible to produce blends of the inkjet inks that will simulate closely the spectral reflectance and hence the colors of compounded plastics, including the impact of the temperature of the extruder on the pigments. Many pigments become partially solubilized by the high temperature of the extrusion process. So simply matching the chemistry of the pigmentation is not sufficient to produce a close spectral match. What is required is that the inkjet inks will match the colors of the dispersed pigments after being processed and melted by the molding process. Plastic chips that exemplify the range of colors available could be created, labeled, and die-cut to size in a single process step, saving many, many hours of processing through a compounding machine, an extrusion and molding machine, a drilling and cutting machine, and moving the plastic in bulk from one machine to the next.

The method of the present invention may also be used in other applications where printing a custom color may be desired. Such applications include printing directly on food and pharmaceuticals (such as tablets, to identify a brand or dose); packaging material used for food or pharmaceuticals; wood; metal; or glass.

EXAMPLES

Example 1: Spot Color Match to Pantone®GOE System® Reference Colors

Digital Base Color Assortment Library:

To create a digital base color assortment library, using a set of base inks, that could be used by IFS technology to predict custom ink formulations, five standard inks were serially diluted into a series of custom ink cartridges. The series of inks was printed over unprinted (white) and printed (black) areas of inkjet receptive paper. The spectral signature of each print was measured using a portable spectrophotometer (SpectroEye). The following CIE color values were measured:

L*=lightness value a*=red/green value, where positive values indicate amounts of red, and negative values indicate amounts of green b*=yellow/blue value, where positive values indicate amounts of yellow, and negative values indicate amounts of blue The spectral values of each printed ink were digitally stored in a base color assortment library.

Ink Formulation:

Five Patone®GOE System® colors were chosen for spot color matching. Using IFS technology, custom ink formulations were developed from the base color assortment library spectral signatures to match each of the reference colors, wherein the tolerance/color difference (ΔE) of the spot color print and the reference color was less than 2.0 color space units, and preferably less than 1.0 color space unit.

Although the CMC system for calculation of color difference and color tolerance was used in the present example, the invention is not so limited. One of skill in the art would know that any color difference/tolerance equation or system, whether already existing or future developed, may be used within the scope and spirit of the invention. Also note that although the most commonly used values of 1:c, the ratio of 2:1, were used in the following calculations, one of skill in the art would know that for smoother surfaces values of 1:1 have been shown to be advantageous.

$\Delta E_{CMC}$ between the experimental color (ex) and the reference color (ref) was calculated using the following equation:

$$\Delta E_{CMC}(1:c) = \sqrt{\left(\frac{\Delta L^*}{1 \cdot S_L}\right)^2 + \left(\frac{\Delta C^*}{c \cdot S_c}\right)^2 + \left(\frac{\Delta H^*}{S_H}\right)^2}$$

wherein:

1:c is 2:1;

$S_L = \dfrac{0.040975 \cdot L^*_{ref}}{(1 + 0.01765 \cdot L^*_{ref})}$ when $L^*_{ref} \geq 16$; or $S_L = 0.511$ when $L^*_{ref} < 16$;

$S_C = \dfrac{0.0638 \cdot C^*_{ref}}{(1 + 0.0131 \cdot C^*_{ref})} + 0.0638$ $S_H = S_c(T \cdot f + 1 - f)$ where $f = \left\{\dfrac{(C^*_{ref})^4}{(C^*_{ref})^4 + 1900}\right\}^{1/2}$ $T = 0.56 + |0.2 \cos(h_{ref} + 168°)|$ if $164° < h_{ref} < 345°$;

otherwise $T = 0.36 + |0.4 \cos(h_{ref} + 35°)|$ and where $C^*ab = \sqrt{(a^*)^2 + (b^*)^2}$ for each color; and $\Delta C^* = (C^*_{ex} - C^*_{ref})$;

$\Delta H^* = s[2(C^*_{ex}C^*_{ref} - a^*_{ex}a^*_{ref} - b^*_{ex}b^*_{ref})]^{0.5}$;

wherein:

if $(a^*_{ref}b^*_{ex})>(a^*_{ex}b^*_{ref})$ then $s=1$; otherwise $s=-1$;

$h_{ref}$ is the hue angle of the reference color, wherein:

if $b^*_{ref}=0$ then $h_{ref}=90$ sign$(a^*_{ref})$[sign$(a^*_{ref})-1$];otherwise $h_{ref}=180-(180/\pi)$arctan$(a^*_{ref}/b^*_{ref})-90$ sign$(b^*_{ref})$ where "sign" is a function that returns the sign of the argument, wherein $h_{ref}=h_{ab}$ for the reference color, and $h_{ab}$ units are degrees counter-clockwise from the positive a* axis, so that "sign" will return a minus one for negative values of the argument, a zero when the argument is zero, and a positive one for positive values of the argument; and $\Delta L^*$=the lightness value difference between the experimental color and the reference color as measured by the SpectroEye.

Results:

By matching the spectral signatures of the inkjet ink base colors to the spectral signatures of the universal dispersions used to create the Pantone® reference colors, it was possible to formulate inkjet inks wherein the color difference between the spot color print of the experimental ink and the Pantone reference color was less than 2.0 color space units, and preferably less than 1.0 color space unit. Table 1 shows the color difference calculation for each experimental inkjet ink and its respective Pantone® reference color.

TABLE 1

Spectral Comparison of Experimental Inks and Pantone Reference Colors

| Experimental Ink | Pantone ® Reference Color | ΔE |
| --- | --- | --- |
| 1 | GOE 9-1-1 | 0.92 |
| 2 | GOE 126-1-1 | 0.71 |
| 3 | GOE 49-1-1 | 1.59 |
| 4 | GOE 93-1-1 | 0.50 |
| 5 | GOE 164-2-2 | 0.92 |

The present invention has been described in detail, including the preferred embodiments thereof. However, it will be appreciated that those skilled in the art, upon consideration of the present disclosure, may make modifications and/or improvements on this invention that fall within the scope and spirit of the invention.

All references cited herein are hereby incorporated by reference in their entirety for all purposes.

While the present invention has been described with reference to the specific embodiments thereof, it should be understood by those skilled in the art that various changes may be made, and equivalents may be substituted, without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A method for digitally printing a custom color swatch comprising:

a) producing a custom color ink that is a spectral match to a reference color by blending an inkjet base ink having a reflectance factor value with transparent white bases to produce the custom color ink; wherein the reference color is prepared using a paint primary color base; wherein the reflectance factor value of the inkjet base ink differs by no more than 3% from the reflectance factor value of the paint primary color base of the reference color at each wavelength; and b) printing the custom color ink using an inkjet printer to produce the printed custom color.

2. The method of claim 1, wherein the reflectance factor value of the inkjet base ink differs by no more than 1% from the reflectance factor value of the paint primary color base of the reference color at each wavelength.

3. The method of claim 1, wherein the custom color is a paint color.

4. The method of claim 1, wherein the custom color is a textile color.

5. The method of claim 1, wherein the custom color is a plastic color.

6. The method of claim 2, wherein the paint color is part of a paint color selection guide.

7. The method of claim 4, wherein the textile color is part of a textile color selection guide.

8. The method of claim 5, wherein the plastic color is part of a plastic color selection guide.

9. The method of claim 1, wherein the custom color ink is produced using a computer assisted colorant recipe prediction system optimized for matching ink colors and containing a library of base inks whose colors are spectral matches to a set of universal colorant dispersions used to produce said color when mixed with transparent white bases.

10. The method of claim 1, further comprising the use of a portable digital format image file that contains the image of the color swatches to be printed.

11. The method of claim 1, wherein the inkjet printer is a wide format inkjet printer.

12. The method of claim 1, wherein the base inks are kept in a container interfaced to a computer capable of digitally dispensing the base ink into a container or package so that the combination of base inks can be thoroughly mixed and charged into a printing head for a digital printer.

13. The method of claim 1, wherein the digital printing is carried out by a digital UV printer that incorporates either UV LED sources or UV arc lamp sources to provide energy for curing UV inks.

14. The method of claim 1, wherein the digital printing is carried out by a digital printer that uses water-borne or latex inks and that incorporates a heating and drying station to dry the water-borne inks.

15. The method of claim 1, wherein the digital printing is carried out by a digital printer that is a solvent-based printer that incorporates a heating and drying station to dry the solvent-based inks.

16. The method of any one of claim 1, wherein the digital printing is carried out by a digital printer that incorporates hot melt inks.

17. The method of claim 1, wherein the digital printing is carried out by a digital printer incorporating thermal transfer printing.

18. The method of claim 1, wherein the inkjet printer uses a continuous inkjet printing method.

19. The method of claim 1, wherein the inkjet printer uses a drop-on-demand inkjet printing method.

20. The method of claim 1, in which color swatch and graphic text labels are applied in a 1-step printing process.

21. The method of claim 1, used to produce a printed sheet of color swatches.

22. A color swatch card, palette, or display produced using the method of claim 1.

23. A method for digitally printing a custom color directly on a product comprising:
   a) producing a custom color ink that is a spectral match to a reference color by blending an inkjet base ink having a reflectance factor value with transparent white bases to produce the custom color ink; wherein the reference color is prepared using a paint primary color base; wherein the reflectance factor value of the inkjet base ink differs by no more than 3% from the reflectance factor value of the paint primary color base of the reference color at each wavelength; and
   b) printing the custom color ink using an inkjet printer to produce the printed custom color.

24. The method of claim 23, wherein the product is a food product.

25. The method of claim 23, wherein the product is a pharmaceutical product.

26. The method of claim 23, wherein the product is a packaging material for food or pharmaceuticals.

27. The method of claim 23, wherein the product is a wood product.

28. The method of claim 23, wherein the product is a metal product.

29. The method of claim 23, wherein the product is a glass product.

30. The method of claim 23, wherein the product is a plastic product.

* * * * *